United States Patent
Kasai et al.

(10) Patent No.: US 6,514,892 B1
(45) Date of Patent: Feb. 4, 2003

(54) TRANSPARENT BEADS AND THEIR PRODUCTION METHOD

(75) Inventors: Toshihiro Kasai, Sagamihara (JP); Kenton D. Budd, Woodbury, MN (US); Stephen L. Lieder, Wyoming, MN (US); James A. Laird, Hudson, WI (US); Chikafumi Yokoyama, Kawasaki (JP); Toshinori Naruse, Sagamihara (JP); Kenji Matsumoto, Kawasaki (JP); Hirohiko Ono, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/563,627

(22) Filed: May 2, 2000

(51) Int. Cl.⁷ .................................................. B32B 5/16
(52) U.S. Cl. ................... 501/34; 428/323; 428/328; 428/329; 428/330; 428/331; 428/402; 428/325; 428/913; 501/106; 501/107; 501/108; 501/119; 501/103; 501/105; 501/901
(58) Field of Search ................ 428/323, 328–331, 428/402, 325, 913; 501/34, 106–108, 119, 901, 103, 105

(56) References Cited

U.S. PATENT DOCUMENTS

| | | | |
|---|---|---|---|
| 2,354,018 A | 7/1944 | Heltzer et al. | 359/538 |
| 2,873,197 A | 2/1959 | McMullen | 501/31 |
| 2,924,533 A | 2/1960 | McMullen | 501/103 |
| 2,960,594 A | 11/1960 | Thorpe | 219/75 |
| 2,963,378 A | 12/1960 | Palmquist | 106/1.25 |
| 3,145,114 A | 8/1964 | Rindone | 501/34 |
| 3,149,016 A | 9/1964 | Tung et al. | 428/402 |
| 3,228,897 A | 1/1966 | Nellessen | 106/1.25 |
| 3,323,888 A | 6/1967 | Searight et al. | 65/21.2 |
| 3,410,185 A | 11/1968 | Harrington | 404/77 |
| 3,416,936 A | 12/1968 | Sproul | 501/33 |
| 3,432,314 A | 3/1969 | Mazdiyasni et al. | 501/103 |
| 3,493,403 A | 2/1970 | Tung et al. | 501/34 |
| 3,560,074 A | 2/1971 | Searight et al. | 359/541 |
| 3,709,706 A | 1/1973 | Sowman | 501/103 |
| 3,749,763 A | 7/1973 | Scammon, Jr. et al. | 423/608 |
| 3,795,524 A | 3/1974 | Sowman | 501/85.1 |
| 3,864,113 A | 2/1975 | Dumbaugh et al. | 65/60.51 |
| 3,915,771 A | 10/1975 | Gatzke et al. | 156/71 |
| 4,056,602 A | 11/1977 | Matovich | 423/345 |
| 4,082,427 A | 4/1978 | Nakashima | 359/540 |
| 4,095,974 A | 6/1978 | Matovich | 75/345 |
| 4,106,947 A | 8/1978 | Recasens | 501/107 |
| 4,137,086 A | 1/1979 | Potter et al. | 501/73 |
| 4,248,932 A | 2/1981 | Tung et al. | 428/325 |
| 4,564,556 A | 1/1986 | Lange | 428/325 |
| 4,607,697 A | 8/1986 | Urffer | 166/280 |
| 4,621,936 A | 11/1986 | Hansson et al. | 401/215 |
| 4,758,469 A | 7/1988 | Lange | 428/325 |
| 4,772,511 A * | 9/1988 | Wood et al. | 428/325 |
| 4,837,069 A | 6/1989 | Bescup et al. | 428/148 |
| 4,931,414 A | 6/1990 | Wood et al. | 501/103 |
| 5,227,221 A | 7/1993 | Hedblom | 428/172 |
| 5,268,789 A | 12/1993 | Bradshaw | 359/534 |
| 5,286,682 A | 2/1994 | Jacobs | 501/34 |
| 5,310,278 A | 5/1994 | Kaczmarcik et al. | 404/14 |
| 5,502,012 A | 3/1996 | Bert et al. | 501/103 |
| 5,576,097 A | 11/1996 | Wyckoff | 428/325 |
| 5,670,209 A | 9/1997 | Wyckoff | 427/215 |
| 5,698,482 A | 12/1997 | Frank et al. | 501/10 |
| 5,716,706 A | 2/1998 | Morris | 428/402 |
| 6,335,083 B1 * | 1/2002 | Kasei et al. | 428/143 |

FOREIGN PATENT DOCUMENTS

| | | |
|---|---|---|
| JP | 51-55428 | 5/1976 |
| JP | 53-22513 | 3/1978 |
| JP | 53-88815 | 8/1978 |
| JP | 53-102325 | 9/1978 |
| JP | 55-20254 | 2/1980 |
| JP | 55-20256 | 2/1980 |
| JP | 55-126547 | 9/1980 |
| JP | 55-126548 | 9/1980 |
| JP | 56-41852 | 4/1981 |
| JP | 60215549 | 10/1985 |
| JP | 61-68349 | 4/1986 |
| JP | 61-270235 | 11/1986 |
| JP | 585771 | 4/1993 |

OTHER PUBLICATIONS

Ceram. Engr. Sci. Proc., 16, 1015–25 (1995).
Ceram. Engr. Sci. Proc., 16 (2) 84–95 (1995).
Journal De Physique, Coloque C1, supplement au n 2, Tome 47, fevrier 1986, p. C1–473.

* cited by examiner

*Primary Examiner*—Leszek Kiliman
(74) *Attorney, Agent, or Firm*—Carolyn A. Fischer

(57) ABSTRACT

Transparent solid, fused microspheres are provided. In one embodiment, the microspheres contain alumina, zirconia, and silica in a total content of at least about 70% by weight, based on the total weight of the solid, fused microspheres, wherein the total content of alumina and zirconia is greater than the content of silica, and further wherein the microspheres have an index of refraction of at least about 1.6 and are useful as lens elements.

7 Claims, No Drawings

TRANSPARENT BEADS AND THEIR PRODUCTION METHOD

BACKGROUND OF THE INVENTION

1. Technical Field

The present invention relates to transparent beads that include alumina and/or zirconia, optionally silica, and optionally alkaline earth metals. More particularly, the present invention relates to fused beads having both transparency and mechanical properties suitable for lens elements. In addition, the present invention also relates to methods for producing such transparent beads.

2. Background

Transparent glass beads (i.e., microspheres) used in reflectors such as reflective sheets and road surface reflectors can be produced by, for example, melting methods. Melting methods used to produce beads typically include melting a raw material composition in the form of particulate material. The liquid can then be quenched in water, dried, and crushed to form particles of a size desired for the final beads. The crushed particles are then passed through a flame having a temperature sufficient to melt and spheroidize the crushed particles. For most glasses this is a temperature of about 1000° C. to about 1450° C. Alternatively, the liquid can be poured into a jet of high velocity air. Beads are formed directly in the resulting stream. The velocity of the air is adjusted to control the size of the beads. These beads are normally composed of a vitreous material that are completely amorphous (i.e., noncrystalline), and hence, are often referred to as "vitreous," "amorphous," or simply "glass" beads. Silica is a common component of glass-forming compositions.

Alumina and zirconia have also been used in transparent glass beads to improve mechanical properties such as toughness, hardness, and strength. However, the amount of alumina and zirconia such beads can contain tends to be limited so as to avoid problems arising from crystallization, such as loss of transparency and processing difficulties. Examples of beads containing silica, alumina, and/or zirconia formed using the melting methods of the prior art are described in the following documents.

Glass fibers or beads containing 40–65% by weight silica, 1–10% by weight alumina, 1–10% by weight zirconia, and 25–60% by weight calcia are disclosed in Japanese Unexamined Patent Publication No. 51-55428.

Glass fibers containing 45–65% by weight silica, 0–5% by weight alumina, and 0–24% by weight zirconia are disclosed in Japanese Unexamined Patent Publication (Kokai) No. 53-22513.

Glass beads containing 42–52% by weight silica, 10–23% by weight alumina, 1–8% by weight zirconia, and 10–25% by weight calcia are disclosed in Japanese Unexamined Patent Publication (Kokai) No. 53-102325.

Glass beads containing 42.5–60% by weight silica, 5–20% by weight alumina, 0–5% by weight zirconia, and 1–15% by weight calcia are disclosed in Japanese Unexamined Patent Publication (Kokai) No. 61-270235.

Glass beads containing 45–55% by weight titania, 0–20% by weight barium oxide, 0–15% by weight zirconia, and 0–20% by weight zinc oxide are disclosed in Japanese Unexamined Patent Publication(Kokai) No. 53-88815.

Glass beads containing 28–48% by weight silica, 5–20% by weight alumina, 0–5% by weight zirconia, and 20–45% by weight lead oxide are disclosed in Japanese Unexamined Patent Publication (Kokai) No. 55-126548.

Glass beads containing 35–55% by weight silica, 15–35% by weight alumina, 2–12% by weight titania, 6% by weight or less zirconia, 0.5–10% by weight boron oxide, and 0–20% by weight calcia are disclosed in Japanese Unexamined Patent Publication (Kokai) No. 56-41852.

Glass beads containing 28–65% by weight silica, 1–15% by weight alumina, 10–45% by weight zinc oxide, and 5–25% by weight boron oxide are disclosed in Japanese Unexamined Patent Publication (Kokai) Nos. 60-215549 and 61-68349.

Low melting point, crystallized glass containing 4.5–34% by weight silica, 17–42% by weight alumina, and 13.5–40% by weight boron oxide is disclosed in Japanese Unexamined Patent Publication (Kokai) Nos. 55-20254 and 55-20256.

Hollow glass beads containing 40–59% by weight silica, 0–13% by weight alumina, 6–40% by weight zirconia (or titania), and 5–25% by weight calcia are disclosed in Japanese Unexamined Patent Publication (Kokai) No. 5-85771.

Bead glass containing 30–50% by weight silica, 2–15% by weight alumina, 2–15% by weight zirconia, 10% by weight or less calcia, 0–15% by weight titania and 2–12% by weight boron oxide is disclosed in Japanese Unexamined Patent Publication (Kokai) No. 55-126547.

Beads with higher levels of alumina and/or zirconia can also be formed by melting methods, but tend to be crystalline or partly crystalline. Such beads can have correspondingly higher hardness, strength, and/or toughness. They have been used as grinding media and similar applications. For example, refractory spheroidal particles or pellets containing up to 60% by weight silica, up to 22% by weight alumina, and 45–75% by weight zirconia are disclosed in U.S. Pat. No. 2,924,533 (McMullen). These refractory particles include crystalline zirconia, with or without crystalline mullite (a stable form of aluminum silicate), embedded in a siliceous glassy matrix. The crystals (i.e., region of material which has boundaries inside of which the well-defined periodic structure is continuous) of zirconia have a maximum length of around 2 microns. However, such beads are generally opaque due to light scattering from grain boundaries (i.e., boundaries between variably oriented crystals) and boundaries between amorphous and crystalline phases. Highly opaque bodies and glazes result when high index crystals such as zirconia are present in a low index matrix such as fused silica. Maximum opacity results when the size of the high index crystals is near the wavelength of light, for example, about 0.5 micron to 1.0 micron.

Accordingly, it is difficult to efficiently and reproducibly produce glass beads in high yields having a high zirconia and/or high alumina content (e.g., greater than about 40% by weight) that are transparent. This is particularly true using standard melt processes.

Sol-gel techniques have been used to produce transparent beads containing silica, alumina, and/or zirconia. Transparency is achieved because the crystal or grain sizes are typically very small (e.g., less than about 0.1 micron). For example, U.S. Pat. No. 4,564,556 (Lange), discloses solid, transparent, nonvitreous, ceramic beads containing at least one metal oxide phase, such as silica, alumina, and zirconia. Generally, sol-gel techniques involve converting a soluble precursor, colloidal dispersion, sol, aquasol, or hydrosol of a metal oxide (or precursor thereof) to a gel, in which the mobility of the components is restrained. The gelling step is typically followed by drying and then firing to obtain a ceramic, nonvitreous material. Such sol-gel methods produce good quality ceramic beads; however, the processing costs can be quite high.

An object of the present invention is to provide transparent fused beads having alumina and/or zirconia, optionally silica, and optionally alkaline earth metal oxides, that also have good mechanical properties. A further object of the invention is to provide crystalline or partially crystalline fused beads having high transparency and good retroreflectivity. Another object of the present invention is to provide methods for producing these transparent fused beads.

SUMMARY OF THE INVENTION

The present invention provides transparent solid, fused beads (i.e., microspheres). In one embodiment, the microspheres include alumina, zirconia, and silica in a total content of at least about 70% by weight, based on the total weight of the solid, fused microspheres, wherein the total content of alumina and zirconia is greater than the content of silica, and further wherein the microspheres have an index of refraction of at least about 1.6 and are useful as lens elements.

In another embodiment, transparent solid, fused microspheres comprise: alumina, zirconia, and silica in a total content of at least about 70% by weight, based on the total weight of the solid, fused microspheres, wherein: (i) there is no greater than about 35% by weight silica; (ii) the total content of alumina and zirconia is within a range of about 45% by weight to about 95% by weight; and zinc oxide, one or more alkaline earth metal oxide, or combinations thereof, in a total amount of about 0.1% by weight to about 30% by weight; and further wherein the microspheres have an index of refraction of at least about 1.6 and are useful as lens elements.

A further embodiment of the present invention of transparent solid, fused microspheres includes at least about 40% by weight alumina, wherein the microspheres have an index of refraction of at least about 1.6 and are useful as lens elements.

Yet another embodiment of the present invention of transparent solid, fused microspheres includes alumina and zirconia in a total content of at least about 45% by weight, based on the total weight of the microspheres, wherein the microspheres have an index of refraction of at least about 1.6 and are useful as lens elements.

A further embodiment includes transparent solid, fused microspheres having a Vickers hardness of at least about 900 $kg/mm^2$, wherein the microspheres have an index of refraction of at least about 1.6 and are useful as lens elements.

A still further embodiment includes transparent solid, fused microspheres having a nanoscale glass ceramic microstructure, wherein the microspheres have an index of refraction of at least about 1.6 and are useful as lens elements.

Preferably, the transparent solid, fused microspheres further include at least one alkaline earth metal oxide, which is preferably calcium oxide or magnesium oxide.

Preferably, the transparent solid, fused microspheres have a nanoscale glass ceramic microstructure. More preferably, the microspheres include a zirconia crystalline phase.

The present invention also provides a retroreflective article comprising transparent solid, fused microspheres described above. The article is preferably a pavement marking tape comprising a backing and a layer of transparent solid, fused microspheres coated thereon. The present invention also provides a pavement marking comprising transparent solid, fused microspheres described above.

The present invention also provides a method for producing transparent solid, fused microspheres described above. The method includes: providing a starting composition comprising one or more of aluminum raw material, zirconium raw material, silicon raw material, zinc raw material, and alkaline earth metal raw material; melting the starting composition to form molten droplets; and cooling the molten droplets to form quenched fused beads. Preferably, the method further includes a step of heating the quenched fused beads. This heating step is preferably carried out in a manner to form transparent solid, fused microspheres having a nanoscale glass ceramic microstructure. Preferably, the starting composition, which can be in the form of classified agglomerates, is preheated prior to the melting step.

DETAILED DESCRIPTION OF PREFERRED EMBODIMENTS

The present invention provides transparent, solid, fused beads (i.e., microspheres) of various compositions containing relatively high levels of alumina and/or zirconia. Optionally, the beads also contain silica. As used herein, "fused" beads refer to those that are prepared by a melt process, as opposed to a sol-gel process. Such fused beads may be completely amorphous (i.e., noncrystalline) or they may have crystalline and noncrystalline regions. Upon initial formation from a melt, typically the beads are substantially amorphous (but can contain some crystallinity); however, upon further heat treatment, the beads can develop crystallinity in the form of a nanoscale glass ceramic microstructure (i.e., microstructure in which a significant volume fraction of crystals less than about 100 nanometers in diameter has grown from within an initially amorphous structure). Preferably, the size of the crystals in the crystalline phase is less than about 20 nanometers (0.02 micron) in diameter. Crystals of this size are not typically effective light scatterers, and therefore, do not decrease the transparency significantly.

Typically, fused beads comprise a dense, atomistically homogeneous glass network from which nanocrystals can nucleate and grow during subsequent heat treatment. Sol-gel beads typically comprise a mixture of amorphous material, such as sintered colloidal silica, and nanocrystalline components, such as zirconia, which crystallize during chemical precursor decomposition or sintering. The remaining amorphous matrix of sol-gel beads tends to be less resistant to further crystallization and opacification than that of the fused beads of the present invention. This is particularly true for preferred alkaline earth containing compositions.

The terms "beads" and "microspheres" are used interchangeably and refer to particles that are substantially, although perhaps not exactly, spherical. The term "solid" refers to beads that are not hollow, i.e., they lack substantial cavities or voids. To be useful as lens elements, the beads should be spherical and solid. Solid beads are typically more durable than hollow beads, particularly when exposed to freeze-thaw cycles.

The term "transparent" means that the fused beads when viewed under an optical microscope (e.g., at 100×) have the property of transmitting rays of visible light so that bodies beneath the beads, such as bodies of the same nature as the beads, can be clearly seen through the beads when both are immersed in oil of approximately the same refractive index as the beads. Although the oil should have a refractive index approximating that of the beads, it should not be so close that the beads seem to disappear (as they would in the case of a perfect index match). The outline, periphery, or edges of bodies beneath the beads are clearly discernible.

Transparent fused solid beads according to the present invention have an index of refraction of at least about 1.6, preferably, about 1.6 to about 1.9, and more preferably, about 1.75 to about 1.85. Such beads (i.e., microspheres) are useful as lens elements in retroreflective articles.

Beads of the invention can be made and used in various sizes, although about 50 µm to about 500 µm is typically desired. It is difficult to deliberately form beads smaller than 10 µm in diameter, though a fraction of beads down to 2 µm or 3 µm in diameter is sometimes formed as a by-product of manufacturing larger beads. Generally, the uses for beads call for them to be less than about 2 millimeters in diameter, and most often less than about 1 millimeter in diameter.

Transparent fused beads according to the present invention exhibit generally high hardness levels, generally high crush strengths, and high durability. For example, the Vickers hardness of the transparent beads is preferably at least about 700 kg/mm$^2$, more preferably at least about 900 kg/mm$^2$, even more preferably at least about 1,000 kg/mm$^2$, and most preferably at least about 1300 kg/mm$^2$. Although there is no particular limit on the upper limit of hardness, the hardness is typically no greater than about 2,000 kg/mm$^2$.

The crush strength values of the beads of the invention can be determined according to the test procedure described in U.S. Pat. No. 4,772,511. Using this procedure, the beads demonstrate a crush strength of preferably at least about 100,000 psi (690 MPa), more preferably at least about 140,000 psi (960 MPa), and most preferably at least about 180,000 psi (1240 MPa).

The durability of the beads of the invention can be demonstrated by exposing them to a compressed air driven stream of sand according to the test procedure described in U.S. Pat. No. 4,758,469. Using this procedure, the beads are highly resistant to fracture, chipping, and abrasion, as evidenced by retention of about 50% to about 80% of their original reflected brightness.

Bead Compositions

As is common in the glass and ceramic art, the components of the beads are described as oxides, which is the form in which they are presumed to exist in the completed articles, and which correctly account for the chemical elements and their proportions in the beads. The starting materials used to make the beads may be some chemical compound other than an oxide, such as a carbonate, but the composition becomes modified to the oxide form during melting of the ingredients. Thus, the compositions of the beads of the present invention are discussed in terms of a theoretical oxide basis.

Generally, transparent fused beads according to the present invention include relatively high levels of alumina and/or zirconia. They optionally can also include silica and oxides of one or more alkaline earth metals. In addition, the transparent fused beads can contain zinc oxide either in place of or in combination with an oxide of an alkaline earth metal. Moreover, the beads can include elements such as lithium, sodium, potassium, titanium, yttrium, tin, boron, and the like, either alone or in combination, provided they do not detrimentally impact the desired properties of the beads. Typically, no greater than about 20% by weight of these oxides should be incorporated into the beads of the invention, although it is preferred that alkali metal oxides be included in the beads in no more than about 10% by weight.

In the compositions in which the total content of more than one component is discussed, the beads can include only one of the components listed, various combinations of the components listed, or all of the components listed. For example, if a bead composition is said to include a total content of alumina and zirconia in an amount of 45% by weight, it can include 45% by weight alumina, 45% by weight zirconia, or 45% by weight of alumina plus zirconia.

In a preferred embodiment, transparent beads according to the present invention include silica, alumina, and zirconia in a total amount of at least about 70% by weight, based on the total weight of the beads. Preferably, the total content of these components is at least about 75% by weight, more preferably, at least about 80% by weight, and most preferably, at least about 90% by weight.

Generally, in transparent fused beads of the invention, alumina and zirconia act to effectively increase the hardness, strength, and toughness of the beads. Thus, making the total amount of alumina and zirconia greater than the amount of silica is effective for increasing bead hardness. The ratio of the total weight of alumina plus zirconia to the weight of silica, namely (alumina+zirconia)/silica, is preferably at least about 1.2. More preferably, the ratio is within a range of about 1.2 to about 10.0, even more preferably, about 1.5 to about 6.0, and most preferably, about 2.0 to about 5.5. If this ratio of alumina plus zirconia to silica is too small, the effect of increasing bead hardness will decrease. Conversely, if this ratio is too large, there is the risk of impairing bead transparency.

Hardness is even more effectively increased upon incorporating a zirconia crystal phase within transparent fused beads of the present invention. In addition, toughness is also improved upon incorporating a zirconia crystal phase within transparent fused beads. Furthermore, the formation and propagation of cracks in the beads can be prevented or reduced upon incorporating a zirconia crystal phase. The incorporation of a zirconia crystal phase can occur by several methods, which are described in greater detail below. Preferably, the method used is one that forms zirconia crystals of a size within the range of about 3 nm to about 50 nm, which can be confirmed by, for example, X-ray diffraction analysis, neutron diffraction analysis, or transmission electron microscopy, as known in the art.

Preferably, the zirconia content of transparent fused beads according to the present invention is at least about 14% by weight and no greater than about 70% by weight, although beads containing a sufficiently high level of alumina with little or no zirconia can also be useful. If the zirconia content is less than about 14% by weight, there is a risk of the mechanical properties of the beads being detrimentally affected, unless high levels of alumina are present, for example. Conversely, if the zirconia content exceeds about 70% by weight, there is a risk of the transparency being detrimentally affected. More preferably, the zirconia content is about 18% to about 50% by weight, and most preferably about 20% to about 35% by weight. For beads containing at least about 40% by weight alumina, however, the zirconia content is typically no greater than about 25% by weight, and preferably about 5% by weight to about 25% by weight.

Preferably, the alumina content of transparent fused beads according to the present invention is at least about 24% by weight and no greater than about 80% by weight. If the alumina content is less than about 24% by weight, there is a risk of the mechanical properties of the beads being detrimentally affected. Conversely, if the alumina content exceeds about 80% by weight, there is a risk of the transparency being detrimentally affected. More preferably, the alumina content is about 25% to about 65% by weight, and most preferably 26% to about 55% by weight. In certain preferred embodiments, the alumina content of transparent fused beads according to the present invention is at least about 40% by weight, and more preferably at least about 45% by weight. Most preferably, high alumina content beads contain alumina within a range of about 40% by weight to about 55% by weight. If zirconia is also present, the alumina content can be slightly lower. For such embodiments, the alumina content is preferably at least about 30% by weight.

Preferably, the silica content of transparent fused beads according to the present invention is less than the total content of alumina and zirconia, regardless of whether or not a zirconia crystal phase is present. Typically, if silica is present, it is present in an amount of no greater than about 35% by weight. More preferably, the silica content is within a range of about 5% to about 35% by weight. If the silica content is less than 5% by weight, there is a risk of the transparency of the beads being detrimentally affected. Conversely, if the silica content exceeds 35% by weight, there is a risk of the mechanical properties being detrimentally affected. Most preferably, the silica content is within a range of about 10% to about 30% by weight.

Optionally, for enhanced transparency, the fused beads according to the present invention can include at least one of either zinc oxide or an oxide of an alkaline earth metal (particularly, calcium and magnesium). Calcium and magnesium oxides are particularly useful. Preferably, the total content of zinc oxide and alkaline earth oxide is at least about 0.1% by weight and no greater than about 30% by weight, although beads containing a sufficiently high level of alumina with higher levels of an alkaline earth oxide can also be useful. If the total content of these oxides is less than 0.1% by weight, there is a risk of the transparency of the beads being detrimentally affected. Conversely, if the total oxide content of these oxides exceeds 30% by weight, there is a risk of the mechanical properties being detrimentally affected, unless high levels of alumina are present, for example. More preferably, the beads contain zinc oxide and/or one or more alkaline earth metal oxides within a range of about 0.1% to about 20% by weight, even more preferably about 0.2% to about 20% by weight, and most preferably about 1.0% to about 12% by weight. For beads containing at least about 40% by weight alumina, however, the zinc oxide and/or alkaline earth metal oxide content is typically no greater than about 55% by weight, and preferably about 20% by weight to about 55% by weight.

Significantly, alkaline earth oxides are believed to promote formation of transparent particles containing a crystalline phase, which have high hardness levels, by reducing the size of the crystals. Although the inventors do not wish to be bound by theory, it is believed that the alkaline earth oxide increases the nucleation rate, suppresses crystal growth rate, or both.

As stated above, in certain preferred embodiments, the alumina content of transparent fused beads according to the present invention is at least about 40% by weight, and preferably at least about 45% by weight, regardless of the other components present. In other preferred embodiments, the total content of alumina and zirconia is at least about 45% by weight, and preferably within a range of about 45% to about 95% by weight, regardless of whether a zirconia crystal phase is present. If the total content is less than 45% by weight, there is a risk of the mechanical properties of the beads being detrimentally affected. Conversely, if the total content exceeds 95% by weight, there is a risk of the transparency being detrimentally affected. More preferably, the total content of alumina and zirconia is within a range of about 50% by weight to about 85% by weight, and most preferably about 51% by weight to about 80% by weight.

Colorants can also be included in the fused beads of the present invention. Such colorants include, for example, $CeO_2$, $Fe_2O_3$, $CoO$, $Cr_2O_3$, $NiO$, $CuO$, $MnO_2$, and the like. Typically, the fused beads of the present invention include no more than about 5% by weight, preferably no more than about 1% by weight, colorant, based on the total weight of the beads (theoretical oxide basis). Also, rare earth elements, such as europium, can be included for fluorescence.

Preferred forms of the transparent beads are as follows, although the present invention is not limited to these forms:

(1) Transparent beads containing silica, alumina and zirconia in which the total content of these is about 70% by weight or more of the total weight of the beads, that are formed by heating a bead precursor (i.e., a quenched fused bead), containing a total amount of alumina and zirconia that is more than the amount of silica, at a temperature of at least about 850° C. and within a range that is below the melting point of the precursor.

(2) Transparent beads as described in the above-mentioned part (1) that are prepared by melting and rapidly cooling a starting composition, prepared so that the above-mentioned bead precursor contains a total amount of alumina and zirconia that is more than the amount of silica in the final product in the form of the transparent beads, and so that it contains at least one of either zinc oxide or an alkaline earth metal oxide (e.g., calcia, magnesia, strontia).

(3) Transparent beads as described in the above-mentioned part (1) or (2) wherein the final product in the form of the transparent beads contains: silica within a range of about 5–35% by weight; alumina within a range of about 24–80% by weight; zirconia within a range of about 14–70% by weight; and alkaline earth metal oxide within a range of about 0.1–30% by weight.

(4) Transparent beads as described in the above-mentioned part (1) or (2) wherein the final product in the form of the transparent beads contains: silica within the range of about 10–30% by weight; alumina within the range of about 25–65% by weight; zirconia within the range of about 18–50% by weight; and alkaline earth metal oxide within the range of about 0.2–20% by weight.

(5) Transparent beads as described in the above-mentioned part (1) or (2) wherein the final product in the form of the transparent beads contains: silica within the range of about 10–30% by weight; alumina within the range of about 26–55% by weight; zirconia within the range of about 20–35% by weight; and alkaline earth metal oxide within the range of about 1.0–12% by weight.

(6) Transparent beads having high levels of alumina, preferably at least about 40% by weight. Such beads may or may not include zirconia or silica. Examples of such beads include those that contain alumina within the range of about 40–55% by weight, no greater than about 35% by weight silica, no greater than about 25% by weight zirconia, and one or more alkaline earth oxides (e.g., calcia, magnesia, strontia) within a range of about 20–55% by weight.

(7) Transparent beads having a total of alumina plus zirconia of at least about 45% by weight. Typically, such beads contain less than about 40% by weight alumina, and preferably at least about 30% by weight alumina, no greater than about 35% by weight silica, no greater than about 25% by weight zirconia, and one or more alkaline earth oxides (e.g., calcia, magnesia, strontia) within a range of about 20–55% by weight.

(8) Transparent beads as described in any of the above-mentioned parts (3) through (7) that further contain a nanoscale glass ceramic microstructure (e.g., zirconia crystal phase).

Preparation of Beads

Beads according to the invention can be prepared by conventional processes as disclosed in U.S. Pat. No. 3,493, 403 (Tung et al). In one useful process, the starting materials are measured out in particulate form, each starting material being preferably about 0.01 µm to about 50 µm in size, and intimately mixed together. The starting raw materials include compounds that form oxides upon melting or heat treatment. These can include oxides (e.g., silica, alumina, zirconia, calcia, magnesia), hydroxides, acid chlorides, chlorides, nitrates, acetates, sulfates, and the like, which can be used either alone or in combination of two or more types. Moreover, compound oxides such as mullite ($3Al_2O_3.2SiO_2$) and zircon ($ZrO_2.SiO_2$) can also be used either alone or in combination with the above-mentioned raw materials.

They are then melted in a gas-fired or electrical furnace until all the starting materials are in liquid form. The liquid batch can be poured into a jet of high-velocity air. Beads of the desired size are formed directly in the resulting stream. The velocity of the air is adjusted in this method to cause a proportion of the beads formed to have the desired dimensions. Typically, such compositions have-a sufficiently low viscosity and high surface tension.

Melting of the starting materials is typically performed by heating at a temperature within a range of about 1500° C. to about 1900° C., and often at a temperature of, for example, roughly 1700° C. A direct heating method using a hydrogen-oxygen burner or acetylene-oxygen burner, or an oven heating method using an arc image oven, solar oven, graphite oven or zirconia oven, can be used to melt the starting materials.

Alternatively, the liquid is quenched in water, dried, and crushed to form particles of a size desired for the final beads. The crushed particles can be screened to assure that they are in the proper range of sizes. The crushed particles can then be passed through a flame having a temperature sufficient to remelt and spheroidize the particles.

In a preferred method, the starting materials are first formed into larger feed particles. The feed particles are fed directly into a burner, such as a hydrogen-oxygen burner or an acetylene-oxygen burner, and then quenched in water (e.g., in the form of a water curtain or water bath). Feed particles may be formed by melting and grinding, agglomerating, or sintering the starting materials. Agglomerated particles of up to about 500 µm in size (the length of the largest dimension) can be used. The agglomerated particles can be made by a variety of well known methods, such as by mixing with water, spray drying, pelletizing, and the like. The starting material, particularly if in the form of agglomerates, can be classified for better control of the particle size of the resultant beads. Whether agglomerated or not, the starting material may be fed into the burner with the burner flame in a horizontal position. Typically, the feed particles are fed into the flame at its base. This horizontal position is desired because it can produce very high yields (e.g., 100%) of spherical particles of the desired level of transparency.

The procedure for cooling the molten droplets typically and preferably involves rapid cooling. Rapid cooling is performed by, for example, dropping the molten droplets of starting material into a cooling medium such as water or cooling oil. In addition, a method can also be used in which the molten droplets are sprayed into an inert gas such as air or argon. The resultant quenched fused beads are typically sufficiently transparent for use as lens elements in retroreflective articles. For certain embodiments, they are also sufficiently hard, strong, and tough for direct use in retroreflective articles. Typically, however, a subsequent heat treating step is desired to improve their mechanical properties.

In a preferred embodiment, a bead precursor can be formed and subsequently heated. As used herein, a "bead precursor" refers to the material formed into the shape of a bead by melting and cooling a bead starting composition. This bead precursor is also referred to herein as a quenched fused bead, and may be suitable for use without further processing if the mechanical properties and transparency are of desirable levels. The bead precursor is formed by melting a starting composition containing prescribed amounts of raw materials (e.g., silicon raw material, aluminum raw material, and zirconium raw material), forming molten droplets of a predetermined particle size, and cooling those molten droplets. The starting composition is prepared so that the resulting bead precursor contains the desired raw materials in a predetermined ratio. The particle size of the molten droplets is normally within the range of about 10 microns (µm) to about 2,000 µm. The particle size of the bead precursors as well as the particle size of the final transparent fused beads can be controlled with the particle size of the molten droplets.

Thus, preferably, the bead precursor (i.e., quenched fused bead) is subsequently heated. Preferably, this heating step is carried out at a temperature below the melting point of the bead precursor. Typically, this temperature is at least 850° C. Preferably, it is about 900° C. to about 1100° C., provided it does not exceed the melting point of the bead precursor. If the heating temperature of the bead precursor is too low, the effect of increasing the mechanical properties of the resulting beads will be insufficient. Conversely, if the heating temperature is too high, there is the risk of transparency decreasing. Although there are no particular limitations on the time of this heating step to improve mechanical properties, normally heating for at least about 10 seconds is sufficient, and heating should preferably be performed for about 1 minute to about 10 minutes. In addition, preheating (e.g., for about 1 hour) at a temperature within the range of about 600° C. to about 800° C. before heat treatment is advantageous because it can further increase the transparency and mechanical properties of the beads.

This method is also suitable for growing a fine zirconia crystal phase in a uniformly dispersed state within a phase that contains, for example, alumina and silica as its main components. A zirconia crystal phase can also form in compositions containing high levels of zirconia upon forming the beads from the melt (i.e., without subsequent heating). Significantly, the zirconia crystal phase is more readily formed (either directly from the melt or upon subsequent heat treatment) by including an alkaline earth metal oxide oxide (e.g., calcium oxide or a substance such as calcium carbonate that forms calcium oxide following melting or heat treatment) in the starting composition.

For compositions susceptible to excessive grain growth (e.g., compositions high in zirconia containing no alkaline earth), an extremely high quench rate is required that could limit the size of retroreflective elements obtainable to a few tens of microns in diameter. Plasma torch processing (as disclosed in U.S. Pat. No. 2,960,594 (Thorpe) and U.S. Pat. No. 3,560,074 (Searight et al.) can be used to increase the quench rate, and form retroreflective elements from, for example, zirconia-silica compositions. In this case, the presence of the glassy siliceous phase is important to prevent excessive shrinkage and cracking which would occur for a fully re-crystallizable compositions.

Applications

Transparent fused beads according to the present invention can be incorporated into coating compositions (see, e.g., U.S. Pat. No. 3,410,185 (Harrington); U.S. Pat. No. 2,963, 378 (Palmquist et al.); and U.S. Pat. No. 3,228,897 (Nellessen)), which generally comprise a film-forming binding material in which the beads are dispersed. Alternatively, the beads can be used in drop-on applications for painted lines as in pavement markings.

Beads of the present invention are particularly useful in pavement-marking sheet material (tapes) as described in U.S. Pat. No. 4,248,932 (rung et al.), and other retroreflective assemblies, such as those disclosed in U.S. Pat. No. 5,268,789 (Bradshaw), U.S. Pat. No. 5,310,278 (Kaczmarczik et al.), U.S. Pat. No. 5,286,682 (Jacobs et al.), and U.S. Pat. No. 5,227,221 (Hedblom). They can be used in exposed lens, encapsulated lens, or embedded lens sheeting.

As taught, for example, in U.S. Pat. No. 2,354,018 (Heltzer et al.) or U.S. Pat. No. 3,915,771 (Gatzke et al.) sheeting useful for pavement markings generally comprises a backing, a layer of binder material, and a layer of beads partially embedded in the layer of binder material. The backing, which is typically of a thickness of less than about 3 mm, can be made from various materials, e.g., polymeric films, metal foils, and fiber-based sheets. Suitable polymeric materials include acrylonitrile-butadiene polymers, millable polyurethanes, and neoprene rubber. The backing can also include particulate fillers or skid resistant particles. The binder material can include various materials, e.g., vinyl polymers, polyurethanes, epoxides, and polyesters, optionally with colorants such as inorganic pigments. The pavement marking sheeting can also include an adhesive, e.g. a pressure sensitive adhesive, a contact adhesive, or a hot melt adhesive, on the bottom of the backing sheet.

Pavement marking sheetings can be made by a variety of known processes. A representative example of such a process includes coating onto a backing sheet a mixture of resin, pigment, and solvent, dropping beads according to the present invention onto the wet surface of the backing, and curing the construction. A layer of adhesive can then be coated onto the bottom of the backing sheet.

EXAMPLES

The following provides an explanation of the present invention with reference to its examples and comparative examples. Furthermore, it should be understood that the present invention is no way limited to these examples. All percentages are in weight percents, based on the total weight of the compositions, unless otherwise specified.

Example 1

Preparation of Starting Composition

The following inorganic raw materials were obtained from Wako Pure Chem. Ind., Ltd., Osaka, Japan and used in the amounts indicated.

| Silica powder | 1.4 g | 19.4% |
| Zirconium oxide powder | 1.7 g | 23.6% |
| Aluminum oxide powder | 2.9 g | 40.3 |
| Zinc oxide powder | 1.2 g | 16.7 |

The above-mentioned inorganic raw materials were uniformly dispersed in 10 g of water using a mortar and pestle after which 0.2 g of organic binder (polyethylene glycol compound 20M: Union Carbide) were dissolved in the dispersion. The resulting mixture was stirred continuously for 2 hours to obtain a liquid mixture. After drying the liquid mixture for approximately 12 hours in an oven at 80° C., stirring was continued for 1 hour using an agate mortar and pestle to obtain a powder mixture. The resulting powder mixture was placed in a mold and molded into the shape of a square column measuring approximately 5 mm in width, 60 mm in length and 3 mm thick using a uniaxial press (4.5 ton load). This molded square column was transferred to a heating oven where it was pre-baked at approximately 500° C. After baking off the organic binder, the molded square column was sintered at 1,250° C. to obtain the target starting composition.

Preparation of Bead Precursor

One end of the starting composition prepared in the manner described above was secured, and the other end was melted in the flame of an acetylene-oxygen burner. The molten droplets were cooled rapidly by dropping into water from a height of approximately 20 cm resulting in the formation of the amorphous bead precursor.

Formation of Transparent Beads

After removing the bead precursor formed in the manner described above from the water and drying, heat treatment was performed using an electric oven (KM-280, Advantec Toyo Co., Tokyo, Japan). Heating conditions consisted of increasing the temperature from room temperature to 650° C. over the course of 30 minutes, preheating for approximately 3 hours at 650° C., again raising the temperature to 950° C. over the course of 15 minutes and heating for 5 minutes at 950° C. The Vickers hardness of the resulting transparent beads was 925 kg/mm$^2$. Here, the value of Vickers hardness was measured by mixing approximately 10–20 transparent beads having a particle size of roughly 1 mm with 10 g of epoxy resin ("SCOTCH CAST" NX-045, 3M Company) and solidifying, forming a cylindrical sample having a diameter of roughly 3 cm and height of roughly 1 cm, grinding that sample to expose the surface of the beads, and measuring the Vickers hardness of the exposed transparent beads using a microhardness tester (MVK-G3, Akashi Seisakusho, Kanagawa, Japan). The measurement load was 300 g, and the load time was 15 seconds.

In addition, the content ratio of each oxide contained in the transparent beads was analyzed using an energy dispersing X-ray spectroscopic analyzer (combining a scanning electron-microscope (JSM-820, JEOL Ltd., Tokyo, Japan) with a spectroscopic analyzer (860-500J, Oxford Inst. Co., England)). The respective content ratios of the oxides were 26% by weight of silica, 39% by weight of alumina, 30% by weight of zirconia and 5% by weight of zinc oxide. Moreover, the transparent beads of the present example were found to be amorphous from the results of X-ray diffraction analysis (RINT-1200-X Type, X-ray compatible type, Rigaku denki Co., Tokyo, Japan).

Example 2

The procedure described in the above-mentioned Example 1 was repeated. In the present example, however, a starting composition was prepared so that the content ratios of each of the oxides contained in the transparent beads were as shown in the following composition.

Furthermore, the suppliers of each of the raw materials are the same as in Example 1 (and this applies to all following examples and comparative examples).

| | |
|---|---|
| Silica | 28% by weight |
| Zirconium oxide | 32% by weight |
| Aluminum oxide | 36% by weight |
| Zinc oxide | 2% by weight |
| Calcium oxide | 2% by weight |

The Vickers hardness of the transparent beads obtained in the present example was 958 kg/mm². The transparent beads of the present example were found to contain a zirconia crystal phase having a crystal size of 8.1 nm (half-width value of XRD) based on the results of X-ray diffraction analysis.

Example 3

The procedure described in the above-mentioned Example 2 was repeated. In the present example, however, heating of the bead precursor in order to form the transparent beads was performed at 1,000° C. instead of 950° C. The Vickers hardness of the transparent beads obtained in the present example was, 1,009 kg/mm². Furthermore, the electric oven made by Advantec Toyo Co., Tokyo, Japan (ICS-1600, Type KS-1600) was used for heating the bead precursor because it is suitable for heating to high temperatures of 1,000° C. or higher.

Examples 4–12

The procedure described in the above-mentioned Example 1 was repeated. In the case of the present example, however, starting compositions were prepared so that the content ratios of each of the oxides contained in the transparent beads were as shown in compositions of Table 1 below. Furthermore, the heating temperature for the bead precursor was set to 1,000° C. in Example 5. The Vickers hardness values and zirconia crystal phase sizes of the resulting transparent beads are also shown in Table 1.

TABLE 1

| Ex. | Composition (% by weight) | | | | | Hardness (kg/mm²) | Crystal phase size (nm) |
|---|---|---|---|---|---|---|---|
| | $SiO_2$ | $ZrO_2$ | $Al_2O_3$ | ZnO | CaO | | |
| 4 | 26 | 29 | 41 | 1 | 3 | 986 | 7.4 |
| 5 | 26 | 27 | 44 | 1 | 2 | 975 | 8.2 |
| 6 | 22 | 28 | 46 | 2 | 2 | 929 | 6.7 |
| 7 | 27 | 32 | 39 | 0 | 2 | 1022 | 11.6 |
| 8 | 24 | 29 | 42 | 2 | 3 | 934 | 8.0 |
| 9 | 16 | 29 | 52 | 1 | 2 | 1014 | 5.8 |
| 10 | 26 | 30 | 37 | 4 | 3 | 999 | 7.7 |
| 11 | 25 | 29 | 41 | 1 | 4 | 946 | 7.9 |
| 12 | 24 | 28 | 40 | 3 | 5 | 942 | 8.1 |

Comparative Examples 1–3

The results of measuring the Vickers hardness of glass other than that of the present invention are shown in Table 2 below for the sake of comparison. Furthermore, the glass used in Comparative Examples 1 and 2 was produced by conventional melting methods. In addition, the beads of Comparative Example 3 were produced by the sol gel method and not by melting. These beads had a composition consisting of 33% by weight of $SiO_2$ and 67% by weight of $ZrO_2$.

TABLE 2

| Example | Glass sheet or glass beads | Hardness (kg/mm²) |
|---|---|---|
| Comp. Ex. 1 | Soda potash glass sheet (Masunami Glass Ind., Inc., Japan) | 524 |
| Comp. Ex. 2 | Quartz glass sheet (Toshiba Ceramic Co., Japan) | 733 |
| Comp. Ex. 3 | Glass beads (sol gel method) | 910 |

Example 13

The procedure described in the above-mentioned Example 1 was repeated. In the case of the present example, however, the starting composition was prepared so that the content ratios of each of the oxides contained in the transparent beads were as shown in the compositions below.

| | |
|---|---|
| Silica | 28% by weight |
| Zirconium oxide | 31% by weight |
| Aluminum oxide | 36% by weight |
| Stannic oxide | 1% by weight |
| Calcium oxide | 4% by weight |

The Vickers hardness of the transparent beads obtained in the present example was 923 kg/mm², and the size of the zirconia crystal phase was 7.2 nm.

Example 14

The procedure described in the above-mentioned Example 3 was repeated. In the present example, however, the starting composition was prepared such that the content ratios of each of the oxides contained in the transparent beads were as shown in the compositions below.

| | |
|---|---|
| Silica | 29% by weight |
| Zirconium oxide | 32% by weight |
| Aluminum oxide | 35% by weight |
| Zinc oxide | 1% by weight |
| Calcium oxide | 3% by weight |

The Vickers hardness of the transparent beads obtained in the present example was 965 kg/mm², and the size of the zirconia crystal phase was 7.1 nm.

Example 15

The procedure described in the above-mentioned Example 1 was repeated. In the present example, however, the starting composition was prepared such that the content ratios of each of the oxides contained in the transparent beads were as shown in the compositions below.

| | |
|---|---|
| Silica | 24% by weight |
| Zirconium oxide | 29% by weight |
| Aluminum oxide | 40% by weight |
| Zinc oxide | 2% by weight |
| Stannic oxide | 1% by weight |
| Calcium oxide | 3% by weight |

The Vickers hardness of the transparent beads obtained in the present example was 973 kg/mm², and the size of the zirconia crystal phase was 7.2 nm.

Comparative Example 4

The procedure described in the above-mentioned Example I was repeated. In the present example, however, the starting composition was prepared such that the content ratios of each of the oxides contained in the transparent beads were as shown in the compositions below for the sake of comparison.

| | |
|---|---|
| Zirconium oxide | 43% by weight |
| Aluminum oxide | 57% by weight |

Although the beads obtained in the present comparative example contained a zirconia crystal phase, they were white and opaque.

Comparative Example 5

The procedure described in the above-mentioned Example 1 was repeated. In the present example, however, the starting composition was prepared such that the content ratios of each of the oxides contained in the transparent beads were as shown in the compositions below for the sake of comparison. In addition, the bead precursor was heated for 30 minutes at 900° C.

| | |
|---|---|
| Silica | 27% by weight |
| Zirconium oxide | 30% by weight |
| Aluminum oxide | 43% by weight |

The Vickers hardness of the transparent beads obtained in the present comparative example was 700–800 kg/mm$^2$, and they did not contain a zirconia crystal phase. Although not as hard as the most preferred embodiment, the hardness exceeds that of conventional glass beads.

In addition, when the bead precursor was heated for 5 minutes at 950° C., the resulting beads were white and opaque.

Example 16

The procedure described in the above-mentioned Example 3 was repeated. In the case of the present example, however, the starting composition was prepared so that the content ratios of each of the oxides contained in the transparent beads were as shown in the composition below, and the amount of organic binder was

| | |
|---|---|
| Silica | 21% by weight |
| Zirconium oxide | 26% by weight |
| Aluminum oxide | 45% by weight |
| Calcium oxide | 8% by weight |

The Vickers hardness of the transparent beads obtained in the present example was 949 kg/mm$^2$, and the size of the zirconia crystal phase was 8.0 nm.

Examples 17–25

The procedure described in the above-mentioned Example 16 was repeated. In the case of the present example, however, the starting composition was prepared such that the content ratios of each of the oxides contained in the transparent beads was as shown in Table 3 below, and the heating temperature of the bead precursor was changed to 1,050° C. The Vickers hardness and size of the zirconia crystal phase of the resulting transparent beads are also shown in Table 3.

TABLE 3

| Ex. | Composition (% by weight) | | | | Hardness (kg/mm$^2$) | Crystal phase size (nm) |
|---|---|---|---|---|---|---|
| | SiO$_2$ | ZrO$_2$ | Al$_2$O$_3$ | CaO | | |
| 17 | 21 | 25 | 47 | 7 | 1014 | 8.5 |
| 18 | 20 | 25 | 45 | 10 | 924 | 7.4 |
| 19 | 20 | 24 | 45 | 11 | 924 | 6.8 |
| 20 | 20 | 24 | 47 | 9 | 975 | 6.7 |
| 21 | 20 | 26 | 46 | 8 | 954 | 7.2 |
| 22 | 20 | 27 | 45 | 8 | 973 | 7.0 |
| 23 | 23 | 20 | 49 | 8 | 927 | 8.1 |
| 24 | 16 | 28 | 48 | 8 | 1032 | 9.0 |
| 25 | 14 | 32 | 45 | 9 | 1085 | 9.2 |

Example 26

The procedure described in the above-mentioned Example 16 was repeated. In the present example, however, the starting composition was prepared so that the content ratios of each of the oxides contained in the transparent beads were as shown in the compositions below.

| | |
|---|---|
| Silica | 24% by weight |
| Zirconium oxide | 16% by weight |
| Aluminum oxide | 51% by weight |
| Calcium oxide | 9% by weight |

The Vickers hardness of the transparent beads obtained in the present example was 843 kg/mm$^2$, and the size of the zirconia crystal phase was 5.2 nm.

Comparative Example 6

The procedure described in the above-mentioned Example 16 was repeated. In the case of the present comparative example, however, the starting composition was prepared so that the content ratios of each of the oxides contained in the transparent beads were as shown in the compositions below.

| | |
|---|---|
| Silica | 29% by weight |
| Aluminum oxide | 61% by weight |
| Calcium oxide | 10% by weight |

Since the beads obtained in the present comparative example do not contain zirconia, a mullite phase appeared following heat treatment resulting in the beads becoming cloudy. Furthermore, the Vickers hardness of the beads was 843 kg/mm$^2$.

Comparative Example 7

The procedure described in the above-mentioned Example 1 was repeated. In the case of the present comparative example, however, the starting composition was prepared so that the content ratios of each of the oxides contained in the transparent beads were as shown in the compositions below. In addition, the bead precursor was heated for 30 minutes at 900° C.

| | |
|---|---|
| Silica | 23% by weight |
| Zirconium oxide | 29% by weight |
| Aluminum oxide | 48% by weight |

The Vickers hardness of the transparent beads obtained in the present comparative example was 700–800 kg/mm$^2$, and the beads did not contain a zirconia crystal phase. In addition, when the bead precursor was heated for 5 minutes at 950° C., the resulting beads were white and opaque. Although not as hard as the most preferred embodiment, the hardness exceeds that of conventional glass beads.

Example 27

The procedure described in the above-mentioned Example 1 was repeated. In the case of the present example, however, the following were used for the inorganic raw materials.

| | |
|---|---|
| Zirconium silicate ("ZIRCON FLOUR," Kinsei Matech Co., Osaka, Japan) | 12.9 g |
| Calcium silicate ("KTK" Kinsei Matech Co., Osaka, Japan) | 5.35 g |
| Alumina ("AES-12," Sumitomo Chemical Co., Japan) | 15.6 g |
| Calcium carbonate ("3N-A," Calseed Co., Japan) | 0.37 g |

The Vickers hardness of the transparent beads obtained in the present example was 986 kg/mm$^2$. In addition, the composition of the transparent beads was 21% by weight silica, 47% by weight alumina, 25% by weight zirconia and 7% by weight calcia. Moreover, the transparent beads of the present example were found to contain a zirconia crystal phase having a crystal size of 8.0 nm.

Example 28

The procedure described in the above-mentioned Example 27 was repeated. In the case of the present example, however, the following were used for the

| | |
|---|---|
| Zirconium silicate ("ZIRCON FLOUR," Kinsei Matech Co., Osaka, Japan) | 4.2 g |
| Aluminum silicate (Wako Pure Chemical Ind., Ltd., Osaka, Japan) | 1.48 g |
| Alumina ("AES-12," Sumitomo Chemical Co., Japan) | 4.67 g |
| Calcium carbonate ("3N-A," Calseed Co., Japan) | 1.7 g |

The Vickers hardness of the transparent beads obtained in the present example was 972 kg/mm$^2$. In addition, the composition of the transparent beads was 21% by weight silica, 46% by weight alumina, 25% by weight zirconia, a 8% by weight calcia. Moreover, the transparent beads of the present example were found to contain a zirconia crystal phase having a crystal size of 7.8 nm.

Example 29

Silica powder ("SNOW MARK SP-3," Kinseimatech) 1155 g, zirconium oxide powder ("EP," Daiichikigenso Co.) 2000 g, aluminum oxide powder ("AES-12," Simitomo Chem. Co.) 2600 g, magnesium oxide powder (#200, Tateho Mag Co., Japan) 320 g, and dispersant ("POISE" 532A, Kao Corp., Japan) were mixed with 8000 g of water. The mixture was mixed for 20 hours and dried. The dried powder was ground and put into glass container. The container was rotated for 15 minutes for agglomeration. The agglomerated powder with 83–140 mesh particles (106–180 micron in diameter) was obtained by sieving.

The agglomerated powder with undesired size was re-crushed and re-agglomerated. The sample collected was fired at 1300° C. for 1 hour. A flame was generated with the hydrogen/oxygen ratio of five and with the length of 35 cm. The direction of the flame was set to be essentially horizontal (the angle of flame and ground was approximately 0–20 degrees). The diameter of the burner outlet was 40 mm ("KSA-40," Koushinrikagaku Seikow Co., Tokyo, Japan). A water curtain and a water bath were set at 90 cm from the burner and under the flame, respectively. The sample fired (83–140 mesh) was fed from the bottom of the flame through a pipe (15 mm in diameter and 300 mm length). The sample was molten in the flame to form spherical droplets and quenched in the water curtain and water bath. This process showed steady state at least for three hours. The resultant beads were heat-treated at 1100° C. for 5 minutes after drying. The beads obtained were clear and had a Vickers hardness of 1390 kg/mm$^2$. The sample showed $ZrO_2$ phase in X-ray diffraction analysis.

Example 30

Glass beads were prepared by following Example 29. In this example, the sample fed into flame was unfired. The resultant beads showed similar performance as those of Example 29.

Example 31

Glass beads were prepared by following Example 29. In this example, the composition of the starting material was silica (Wako) 1150 g, zirconium oxide powder (Wako) 2000 g, aluminum oxide powder (Wako) 2600 g, and calcium carbonate powder ("3N-A," Ca;seed Co., Japan) 650 g. The firing temperature was 1350° C. The resultant beads had a Vickers hardness of 1100 kg/mm$^2$ after heat treatment at 1100° C. for 5 minutes.

Example 32

Silica powder (Wako) 2.3 g, zirconium oxide powder (Wako) 2.8 g, aluminum oxide powder (Wako) 4.88 g, and calcium carbonate powder (Wako) 1.6 g were mixed with 20 g of water. To the mixture, polyethylene Glycol Compound 20M (Union Carbide Co.) 0.4 g was added as organic binder. The mixture was mixed for 2 hours and dried. The dried powder was further mixed for 1 hour in the dry state. The powder obtained was press-formed into a rectangular sample with approximately 5 mm width, 60 mm length, and 3 mm thickness using a die and mold. The sample formed was burned-out at 500° C. and sintered at 1250° C.

The sintered sample was held at one end and melted at the other end with the flame of an acetylene-oxygen burner. Bulky glass was formed by dropping the molten metal oxides into water, although some glass beads were formed. The bulky glass was crushed in a mortar and sieved to obtain 83–140 mesh particles (106–180 micron in diameter).

The flame was generated with the hydrogen/oxygen ratio of five, with the length of 35 cm. The direction of flame was set to be horizontal (the angle of flame and ground was approximately 0–20 degrees). The diameter of the burner outlet was 40 mm ("KSA-40," Koushin-rikagaku-seiskusho). Under this condition, the flame was turned up and the direction of flame top was upward. A water curtain and a water bath were set at 90 cm from the burner and under the flame, respectively. The bead precursor (83–140 mesh) was fed from the bottom of flame through a pipe (15 mm in diameter and 300 mm length). The bead precursor was melted in the flame to form spherical droplets and quenched in the water curtain and water bath. The resultant beads were heat-treated at 1000° C. for 5 minutes after drying. The beads obtained were clear and had a Vickers hardness of 955 kg/mm². The sample showed $ZrO_2$ phase in X-ray diffraction analysis.

Example 33

Transparent beads were produced by the method descrbed in Example 32. In this example, 140–282 mesh particles (53–106 micron) were used as a bead precursor.

Example 34

Silica powder ("SNOW MARK SP-3," Kinseimatech Co.) 11.55 g, zirconium oxide powder ("E," Daiichikigenso Ind. Co.) 20 g, aluminum oxide powder ("AES-12," Sumitomo Chem. Co.) 26 g, and magnesium oxide powder (#200, Tateho Mag Co.) 1.6 g were mixed with 400 g of water. To the mixture, polyethylene Glycol Compound 20M (union Carbide Co.) 0.8 g was added as an organic binder. The mixture was mixed for 20 hours and dried. The dried powder was further mixed for 1 hour in the dry state. The powder obtained was preformed into a rectangular sample with approximately 5 mm width, 60 mm length, and 3 mm thickness using a die and mold. The sample formed was burned-out at 500° C. and sintered at 1250° C.

The sintered sample was held at one end and melted at the other end with the flame of an acetylene-oxygen burner. Glass beads were formed by dropping the melt into water. The resultant beads were heat-treated at 1100° C. for 5 minutes after drying. The beads obtained were clear and had a Vickens hardness of 1390 kg mm². The sample showed $ZrO_2$ phase in X-ray diffraction analysis.

Example 35–38

Glass beads were prepared by following Example 34. In this example, the composition of the starting materials are listed in Table 4.

TABLE 4

| Example | $SiO_2$ (g) | $ZrO_2$ (g) | $Al_2O_3$ (g) | MgO (g) | Hardness (kg/mm²) |
|---|---|---|---|---|---|
| 35 | 11.55 | 20 | 26 | 2.0 | 1301 |
| 36 | 11.55 | 20 | 26 | 2.4 | 1208 |
| 37 | 11.55 | 20 | 26 | 2.8 | 1320 |
| 38 | 11.55 | 20 | 26 | 3.2 | 1308 |

The beads were clear and showed zirconia phase in X-ray diffraction analysis.

Example 39

Silica powder ("SNOW MARK SP-3," Kinseimatech) 1155 g, zirconium oxide powder ("EP," Daiichikigenso Co.) 2000 g, aluminum oxide powder ("AES-12," Sumitomo Chem. Co) 2600 g, magnesium oxide powder (#200, Tateho Maag Co. Hyogo, Japan) 320 g, and dispersant ("POISE 532A," Kao Corp.) were mixed with 8000 g of water. The mixture was mixed for 20 hours and dried. The dried powder was ground and put into glass container. The container was rotated for 15 minutes for agglomeration. The agglomerated powder with 83–140 mesh particles (106–180 micron in diameter) was obtained by sieving.

The agglomerated powder with undesired size was re-crushed and re-agglomerated. The sample collected was fired at 1300° C. for 1 hour.

The flame was generated with the hydrogen/oxygen ratio of five, with a length of 35 cm. The direction of flame was set to be horizontal (the angle of flame and ground was approximately 0–20 degrees). The diameter of the burner outlet was 40 mm ("KSA40," Koushin-rikagaku-seisakusho). A water curtain and water bath were set at 90 cm from the burner and under the flame, respectively. The sample fired (83–140 mesh) was fed from the bottom of flame through a pipe (15 mm in diameter and 300 mm) length. The sample was melted in the flame to form spherical droplets and quenched in the water curtain and water bath. The resultant beads were heat-treated at 1100° C. for 5 minutes after drying. The beads obtained were clear and had a Vickers hardness of 1390 kg/mm². The sample showed $ZrO_2$ phase in X-ray diffraction analysis.

Examples 40–43

Glass beads were prepared by following Example 39. In this example, the compositions of the starting materials were as listed in Table 5.

TABLE 5

| Example | $SiO_2$ (g) | $ZrO_2$ (g) | $Al_2O_3$ (g) | MgO (g) | Hardness (kg/mm²) |
|---|---|---|---|---|---|
| 40 | 11.55 | 20 | 26 | 2.0 | 1310 |
| 41 | 11.55 | 20 | 26 | 2.4 | 1305 |
| 42 | 11.55 | 20 | 26 | 2.8 | 1330 |
| 43 | 11.55 | 20 | 26 | 3.2 | 1370 |

The beads were clear and showed zirconia phase in X-ray diffraction analysis.

Example 44

Glass beads were prepared by following example 39. In this example, the sample fed into flame was unfired. The resultant beads showed similar performance with the in example 39.

Example 45

Glass beads were prepared by following Example 39. In this example, the compositions of the starting materials were silica 1150 g, zirconium oxide powder 2000 g, aluminum oxide powder 2600 g, and calcium carbonate powder ("3N-A," karusito Co) 650 g. The firing condition was 1350° C.

The resultant beads were approximately 100% yield as clear beads. Furthermore, the beads showed 1100 kg/mm² of Vickers hardness after heat treatment at 1100° C. for 5 minutes.

Examples 46–58

Several additional compositions with lower melting temperatures were demonstrated to have favorable melting, crystallization characteristics, and hardness. Calculated refractive indices are indicated in Tables 6 and 7. Samples were prepared by hand mixing and shaking in glass jars. Powders sufficient to form 100 grams of glass were loaded into platinum crucibles, heated to 1500° C. for 30 minutes, and poured into a stirred water tank. The resulting frit particles were transparent and had high hardness after annealing. Heat treatments were done by placing frit in alumina crucibles and heating to the indicated temperatures for 60 minutes. Hardness measurements were made by mounting pieces in epoxy plugs, and polishing to 0.5 micron alumina paste finish. Vickers hardness was measured with a Mitutoyo indenter using 100 gram loads. Hardness values in Tables 6 and 7 are given in kg/mm$^2$ in order respective to their heat treatments.

Starting Powders

CaO calcium carbonate (FW 100, used 1.78 g/g CaO in batch, EM Science, Gibbstown, N.J.)

Li$_2$O lithium carbonate (2.47 g/g Li$_2$O in batch, Aldrich Chemical, Milwaukee, Wis.)

MgO basic magnesium carbonate (2.41 g/g MgO in batch, Aldrich Chemical, Milwaukee, Wis.)

Na$_2$O sodium bicarbonate (2.71 g/g Na$_2$O in batch, EM Science)

B$_2$O$_3$ Boric acid (1.78 g/g B$_2$O$_3$ in batch, Acros Organics, Springfield, N.J.)

SiO$_2$ silica (Sil-Co-Sil #90, U.S. Silica, Ottawa, I)

ZrO$_2$ anhydrous zirconia (Fischer Scientific, Pittsburgh, Pa.)

Al$_2$O$_3$ calcined alumina (Alcoa Corp., Nashville, Tenn.)

poured into a high velocity natural gas burner flame and particles were collected in a screened hopper.

Example 56 was formed into retroreflective beads by flame treating presintered particles. A powder batch was prepared as previously described. The powder was hand-packed into a shallow alumina boat and sintered at 1250° C. for 30 minutes. The sintered batch was ground with mortar and pestle, and sized by sieving into 37–120 micron and 120–250 micron fractions. The sintered particles were fed into the flame of a hydrogen/oxygen glass blowing torch at a rate of about 0.5 g per minute. The particles were carried by the torch against a steel backplate equipped with a sprinkler bar to provide a water covered surface.

The complete disclosures of all patents, patent documents, and publications, are incorporated herein by reference as if individually incorporated. It will be appreciated by those skilled in the art that various modifications can be made to the above described embodiments of the invention without departing from the essential nature thereof. The invention is intended to encompass all such modifications within the scope of the appended claims.

What is claimed is:

1. A method for producing transparent solid, fused microspheres comprising:

(a) providing a starting composition comprising one or more of aluminum raw material, zirconium raw material and silicone raw material;

TABLE 6

| Sample # | predicted index of refraction | Hv Hardness (kg/mm$^2$) | (° C.) ht treat temp | Composition (wt %) | | | | | |
|---|---|---|---|---|---|---|---|---|---|
| | | | | Al$_2$O$_3$ | CaO | MgO | Li$_2$O | SiO$_2$ | ZrO$_2$ |
| 46. | 1.77 | 724 | As fired (af) | 43 | 50 | | | 7 | |
| 47. | 1.69 | | | 33 | 21 | | 8 | 25 | 13 |
| 48. | 1.80 | 765,791,837 | af,850,950 | 52 | 41 | 7 | | | |
| 49. | 1.77 | 739,830,853 | af,650,750 | 36.5 | 42 | | 7.5 | 5.5 | 8.5 |
| 50. | 1.70 | 635,709 | af,850 | 40 | 28 | | | 32 | |

TABLE 7

| sample # | predicted Index of refraction | Hv Hardness (kg/mm$^2$) | (° C.) ht treat temp | Al$_2$O$_3$ | CaO | MgO | Na$_2$O | B$_2$O$_3$ | SiO$_2$ | ZrO$_2$ |
|---|---|---|---|---|---|---|---|---|---|---|
| 51. | 1.76 | | | 48 | 39 | 7 | | | 7 | |
| 52. | 1.78 | | | 45 | 36 | 6 | | | 6 | 6 |
| 53. | 1.78 | | | 42 | 33 | 5 | 2 | 4 | 4 | 10 |
| 54. | 1.77 | | | 32 | 25 | 4 | 4 | 9 | 7 | 20 |
| 55. | 1.79 | | | 43 | 49 | | | 8 | | |
| 56. | 1.80 | | | 40 | 32 | 5 | 2.5 | 2.5 | 4 | 14 |
| 57. | 1.81 | | | 36 | 29 | 5 | 3 | 3 | 4 | 20 |
| 58. | 1.78 | 776,801,818 | af,750,850 | 30 | 24 | 4 | 5 | 6 | 8 | 23 |

Although the above samples were not processed into retroreflective elements, the illustrated families of compositions which were developed exhibited the required behavior for practice of the current invention. Selected representative compositions were processed into highly transparent, spherical retroreflective microspheres as indicated below:

Examples 46–49 and 55 were formulated in larger batch sizes (1 kg) for bead formation. Powders were hand mixed with a spoon for 5 minutes, then combined with 1500–2000 ml water and added to a 1 gallon ball mill. Samples were milled for 24 hours, dried in glass pans, and melted at 1500° C. for 60 minutes in platinum crucibles. Glass melts were (b) melting the starting composition to form molten droplets; and (c) cooling the molten droplets to form quenched fused microspheres wherein the microspheres comprise alumina, zirconia, and silica in a total content of at least about 70% by weight, based on the total weight of the solid, fused microspheres; the total content of alumina and zirconia is greater than the content of silica; the microspheres have an index of refraction of at least about 1.6 and are useful as lens elements.

2. The method of claim 1 further comprising a step of heating the quenched fused beads.

3. The method of claim 2 wherein the heating step is carried out in a manner to form transparent solid, fused microspheres having a nanoscale glass ceramic microstructure.

4. The method of claim 1 wherein the starting composition is in the form of classified agglomerates.

5. The method of claim 1 wherein the starting composition is reheated prior to the melting step.

6. The method of claim 1 wherein the step of cooling comprises dropping the molten droplets into water to form quenched fused beads.

7. The method of claim 1 wherein the step of melting comprises feeding the starting composition into a burner flame in a horizontal position.

* * * * *

UNITED STATES PATENT AND TRADEMARK OFFICE
CERTIFICATE OF CORRECTION

PATENT NO. : 6,514,892 B1
DATED : February 4, 2003
INVENTOR(S) : Kasai, Toshihiro It is certified that error appears in the above-identified patent and that said Letters Patent is hereby corrected as shown below:

Title page,
Item [75], Inventors, insert -- , Kanagawa -- preceding "(JP)".
After filing date insert -- Related U.S. Application Data Divisional of application Serial no. 09/062,045 filed April 17, 1998 --.
Item [56], U.S. PATENT DOCUMENTS, delete "Kaczmarcik" and insert in place thereof -- Kaczmarczik --.

Column 9,
Line 20, delete "-" following "have".

Column 10,
Line 49, delete "oxide" following "oxide".
Line 62, delete "a" following "for".

Column 11,
Line 8, delete "rung" and insert in place thereof -- Tung --.

Column 15,
Line 2, delete "I" and insert in place thereof -- 1 --.
Line 49, insert -- changed to 0.4g. -- following "was".

Column 17,
Line 43, insert -- inorganic raw materials -- following "the". (second occurrence)

Column 18,
Line 4, insert -- a -- preceding "glass".
Line 40, delete "Ca;seed" and insert in place thereof -- Calseed --.

Column 19,
Lines 1 and 2, delete "Koushin-rikagaku-seiskusho" and insert in place thereof -- Koushinrikagaku Seikow Co. --.
Line 16, delete "descrbed" and insert in place thereof -- described --.
Line 27, delete "union" and insert in place thereof -- Union --.
Line 40, delete "Vickens" and insert in place thereof -- Vickers --.
Line 40, delete "kg mm$^2$" and insert in place thereof -- Kg/mm$^2$ --.
Line 43, delete "Example" and insert in place thereof -- Examples --.
Line 65, delete "Co" and insert in place thereof -- Co. --.

UNITED STATES PATENT AND TRADEMARK OFFICE
CERTIFICATE OF CORRECTION

PATENT NO.      : 6,514,892 B1
DATED           : February 4, 2003
INVENTOR(S)     : Kasai, Toshihiro It is certified that error appears in the above-identified patent and that said Letters Patent is hereby corrected as shown below:

Column 20,
Line 14, "Koushin-rikagaku-selsakusho" and insert in place thereof -- Koushinrikagaku Seikow Co. --.
Line 14, delete "KSA40" and insert in place thereof -- KSA-40 --.
Line 46, delete "with the in example 39." and insert in place thereof -- as those of Example 39. --.

Column 23,
Line 8, delete "reheated" and insert in place thereof -- preheated --.

Signed and Sealed this

Twenty-eighth Day of October, 2003

JAMES E. ROGAN
*Director of the United States Patent and Trademark Office*